US005481296A

United States Patent [19]
Cragun et al.

[11] Patent Number: 5,481,296
[45] Date of Patent: Jan. 2, 1996

[54] APPARATUS AND METHOD FOR SELECTIVELY VIEWING VIDEO INFORMATION

[75] Inventors: Brian J. Cragun; Paul R. Day, both of Rochester, Minn.

[73] Assignee: International Business Machines Corporation, Armonk, N.Y.

[21] Appl. No.: 103,023

[22] Filed: Aug. 6, 1993

[51] Int. Cl.⁶ .................................................. H04N 7/00
[52] U.S. Cl. .......................... 348/13; 348/461; 348/552; 395/600; 358/335
[58] Field of Search ........................... 395/600; 348/906, 348/907, 460, 461, 465, 468, 6, 1, 5, 7, 552, 571, 12, 13, 335; 455/18; 360/14.1; H04N 7/00, 5/76, 5/93

[56] References Cited

U.S. PATENT DOCUMENTS

| | | | |
|---|---|---|---|
| 4,706,121 | 11/1987 | Young | 348/906 |
| 4,857,999 | 8/1989 | Welsh | 358/84 |
| 4,941,125 | 7/1990 | Boyne | 395/600 |
| 4,967,273 | 10/1990 | Greenberg | 358/460 |
| 5,210,611 | 5/1993 | Yee et al. | 348/906 |

FOREIGN PATENT DOCUMENTS 2258102  1/1993  United Kingdom ..................... 455/18
0004801  3/1992  WIPO.

OTHER PUBLICATIONS

Little et al. "A Digital On–Demand Video Service Supporting Content–Based Queries" Proceedings of the ACM, Multimedia '93, Anaheim, Calif. Aug. 1, 1993.
Television Captioning for the Deaf Signal and Display Specifications Report No. E–7709–C by John Lentz et al, Revised May 1980.

*Primary Examiner*—David E. Harvey
*Attorney, Agent, or Firm*—Roy W. Truelson

[57] ABSTRACT

A television presentation and editing system uses closed captioning text to locate items of interest. A closed captioning decoder extracts a closed captioning digital text stream from a television signal. A viewer specifies one or more keywords to be used as search parameters. A digital processor executing a control program scans the closed captioning digital text stream for words or phrases matching the search parameters. The corresponding segment of the television broadcast may then be displayed, edited or saved. In one mode of operation, the television presentation system may be used to scan one or more television channels unattended, and save items which may be of interest to the viewer. In another mode of operation, the system may be used to assist editing previously stored video by quickly locating segments of interest.

11 Claims, 12 Drawing Sheets

PROFILE CONTROL BLOCK FORMAT 401

| Field Name | Sample Data | |
|---|---|---|
| Title | 'Twins' | 402 |
| Description | 'MN Twins Baseball News' | 403 |
| Interval | 15 | 404 |
| Next Profile PTR | X '0001D780' | 405 |
| Last Profile PTR | X '0001D680' | 406 |
| Time PTR | X '0001E338' | 407 |
| Keyword PTR | X '0001EC50' | 408 |

FIG. 4A

TIME BLOCK FORMAT 410

| Field Name | Sample Data | |
|---|---|---|
| Date or day | M T W H F | 411 |
| Start time | 17:00 | 412 |
| End time | 18:30 | 413 |
| Next Time PTR | X '0001E350' | 414 |
| Channel PTR | X '0001E074' | 415 |

FIG. 4B

CHANNEL BLOCK FORMAT 420

| Field Name | Sample Data | |
|---|---|---|
| Channel | 10 | 421 |
| Next Channel PTR | X '0001E090' | 422 |

FIG. 4C

OR-ED KEYWORD BLOCK FORMAT 430

| Field Name | Sample Data | |
|---|---|---|
| Next OR-ed PTR | X '0001F060' | 431 |
| Key word | 'Minnesota' | 432 |
| Next AND-ed PTR | X '0001EC90' | 433 |

FIG. 4D

AND-ED KEYWORD BLOCK FORMAT 440

| Field Name | Sample Data | |
|---|---|---|
| No. words within | 2 | 441 |
| Key word | 'Twins' | 442 |
| Next AND-ed PTR | X '00000000' | 443 |

FIG. 4E

APPARATUS AND METHOD FOR SELECTIVELY VIEWING VIDEO INFORMATION

FIELD OF THE INVENTION

The present invention relates to television and other video information, and in particular to a novel method and apparatus for selectively viewing television or other video signals.

BACKGROUND OF THE INVENTION

Television has become the world's predominant communications medium. The variety of programming available on television has mushroomed in recent years with the growth of cable networks. In many areas, a viewer can select programming from among dozens of channels, broadcasting news, talk shows, movies soap operas serials etc., from Geraldo Rivera to William F. Buckley, from the banal to the sublime (or the reverse, depending on one's point of view).

Although a large amount of information is broadcast via television, the capability to selectively view television is primitive. Published television listings typically contain a minimal amount of information about the program to be shown, are often difficult to understand, and are subject to frequent errors and changes. Furthermore, a certain amount of television programming, such as a news broadcast, by its nature can not be described in advance.

Most viewers would like greater control over what is being viewed. They may, for example, wish to view specific portions of a news program or a talk show dealing with a topic of interest. They may wish to monitor multiple channels simultaneously. They may wish to screen out programming they regard as offensive.

In theory, a viewer could record one or more television signals on one or more recording devices, such as commonly available video cassette recorders (VCRs), and review all recorded signals, editing such portions as desired. In reality, this would be an extremely tedious and time consuming task.

There has been some recognition of a need to provide a viewer width greater control over what is being watched. For example, it is known in the art to place a small window in one corner of the television display, in which is shown the video signal of another broadcast channel, enabling the viewer to screen one channel while simultaneously watching another. As helpful as this feature is to the viewer, it is obviously limited in its capabilities. Screening multiple channels would require a separate window for each one. The screening must be done at the time the signal broadcast. If something of interest is detected, the channel must be switched, possibly foregoing programming of interest on the channel first being viewed.

Television viewers have accepted this lack of ability to screen, preview or extract portions of television programming only because no alternative has been presented. However, a need exists for advanced capability on the part of the viewer to selectively control what is viewed.

SUMMARY OF THE INVENTION

It is therefore an object of the present invention to provide am enhanced method and apparatus for viewing video information.

Another object of this invention is to increase the ability of a user of video information to control the content of the video presentation.

Another object of this invention is to provide an enhanced method and apparatus for using televised information.

Another object of this invention is to increase the ability of a user of video information to find and view desired information.

Another object of this invention is to increase the ability of a viewer of televised information to locate information of interest from among a plurality of channels and/or programs.

Another object of this invention is to increase the ability of a user of video information to screen out material which the user considers offensive or undesirable.

Another object of this invention is to provide and enhanced method and apparatus for using information in a vertical blanking interval of a video signal to find video matter of interest.

In accordance with the preferred embodiment of the present invention, the information carried in the closed captioning portion of a television signal is extracted and searched to find programming of interest to a viewer. The viewer can then view an entire program segment or edit segments.

A conventional television signal comprises video and audio components. The video component of the signal is capable of carrying additional information during a "vertical blanking interval". In particular, the vertical blanking interval is used to carry closed captioning information, which is a text stream. Typically, this closed captioning information is a simplified version of the spoken words being transmitted by the audio portion of the signal. While not a perfect representation of what is being depicted by the television presentation, the closed captioning text will generally contain words descriptive of a plot, news, or other information being carried by the television signal.

A video presentation system in accordance with the preferred embodiment of the present invention comprises a suitably programmed general purpose digital computer, a television signal receiver/tuner, a closed captioned text decoder, and a mass storage for storing television signals, which could be s conventional video cassette recorder, a large direct access storage device, or other data storage.

A television viewer inputs to the presentation system one or more key words to be used as search parameters. These may be input simply as an unordered set of words, or logical relations such as "AND", "OR", etc. may be specified as known in the art of computer database searching. The computer stores these key words and their required logical relationships. The viewer also directs the presentation system to monitor specified channels at specified times.

The television receiver/tuner receives television signals for the specified channel or channels. The closed captioning portion of the television signal is extracted by the closed captioning text decoder and converted to a digital stream of textual data. The computer then scans the closed captioning textual data stream extracted from the video signal for occurrences of words matching its search parameters.

In a scan mode of operation, scanning is done while the television signal is being received. When a match is found, the corresponding segment of the television signal (video and audio portions) is saved in the mass storage for later viewing. In other modes of operation, the system scans the closed captioning stream of a pre-recorded signal for a match of the search parameters.

What is done with a segment of interest once it has been located will depend upon the desires of the viewer. The viewer may, for example, specify the size of a segment, which could be a relatively short interval (e.g., 15 seconds) before and after the occurrence of the search term, as might be useful for a news broadcast, or could be a much longer interval such as an entire ½ hour television program. The viewer may wish to watch any segments which were found, or may wish to edit and save segments for later viewing. The viewer may wish to edit out small segments of a larger presentation, e.g., where the viewer finds such segments offensive. The system may display to the user all or part of the extracted textual data from the segments, and permit the user to select those segments to be viewed and/or edited.

BRIEF DESCRIPTION OF THE DRAWINGS

FIGS. 4A, 4B, 4C, 4D, and 4E show the format of scan profile data structures according to the preferred and alternative embodiments;

DETAILED DESCRIPTION OF THE PREFERRED EMBODIMENT

Figure 1:
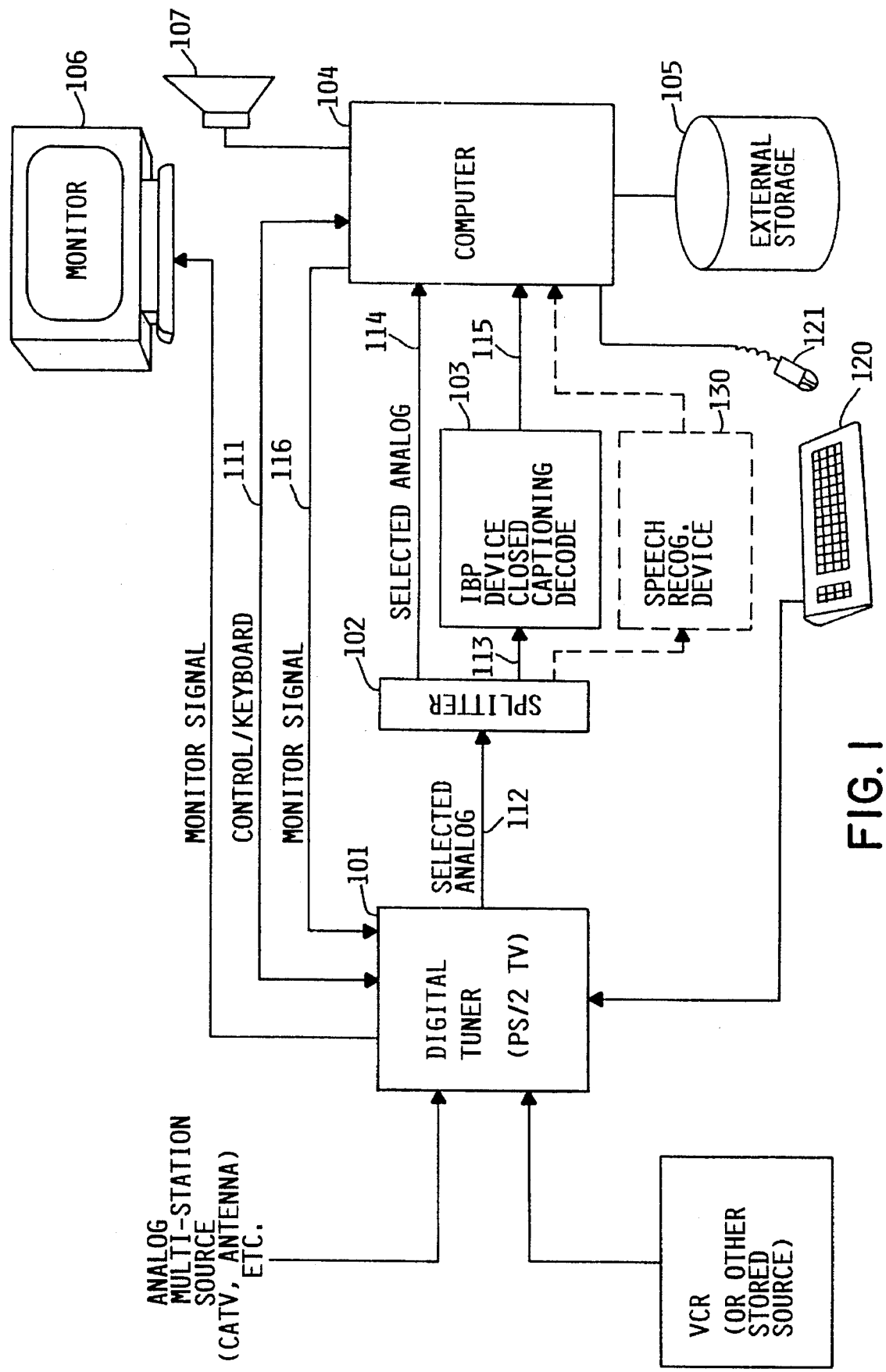
FIG. 1 is a block diagram of the major components of a video presentation system according to the preferred embodiment of this invention.

FIG. 1 shows a block diagram of the major components of a video presentation system according to the preferred embodiment of the present invention. Video presentation system 100 comprises digitally controlled receiver/tuner 101, signal splitter 102, closed captioning text decoder 103, general purpose digital computer system 104, mass storage 105, video display 106 and audio speaker 107. Receiver/tuner 101 receives an analog television signal from an external source, such as an antenna for receiving atmospheric television transmissions, a coaxial transmission cable from a cable television network, or a video cassette recorder. Receiver/tuner 101 receives commands to tune in one or more channels from computer 104 via control line 111. Receiver/tuner 101 demodulates the signal received on a specified channel and outputs the demodulated signal on line 112 to splitter 102. The signal is fed simultaneously from splitter 102 into computer 104 and closed captioning text decoder 103 via lines 113, 114. Closed captioning decoder 103 extracts a stream of textual data from the video signal. This extracted stream is forwarded to computer 104 in digital format on serial digital line 115. Optional speech recognition unit 130 may also be used to provide additional textual data as explained with reference to an alternative embodiment.

Closed captioning decoder 103 is preferably a decoder constructed to convert information contained in line 21 of the vertical blanking interval of a television signal to a text stream. Normally, this information is a modified representation of spoken text being carried in the audio portion of the television signal, and is intended for use by hearing impaired persons. Standards for such devices are specified in 47 C.F.R. 15.119, herein incorporated by reference. Additional information relating to closed captioning decoders is contained in Lentz et al., "Television Captioning for the Deaf Signal and Display Specifications" (Public Broadcasting Service, 1980), incorporated herein by reference as additional background information.

In the preferred embodiment, receiver/tuner 101 is an IBM PS/2 TV. Computer 104 is an IBM PS/2 personal computer. It should be understood that other hardware performing similar function could be used in place of that specified here, in particular any of various commercially available video function cards which plug into available slots of a personal computer.

Figure 2:
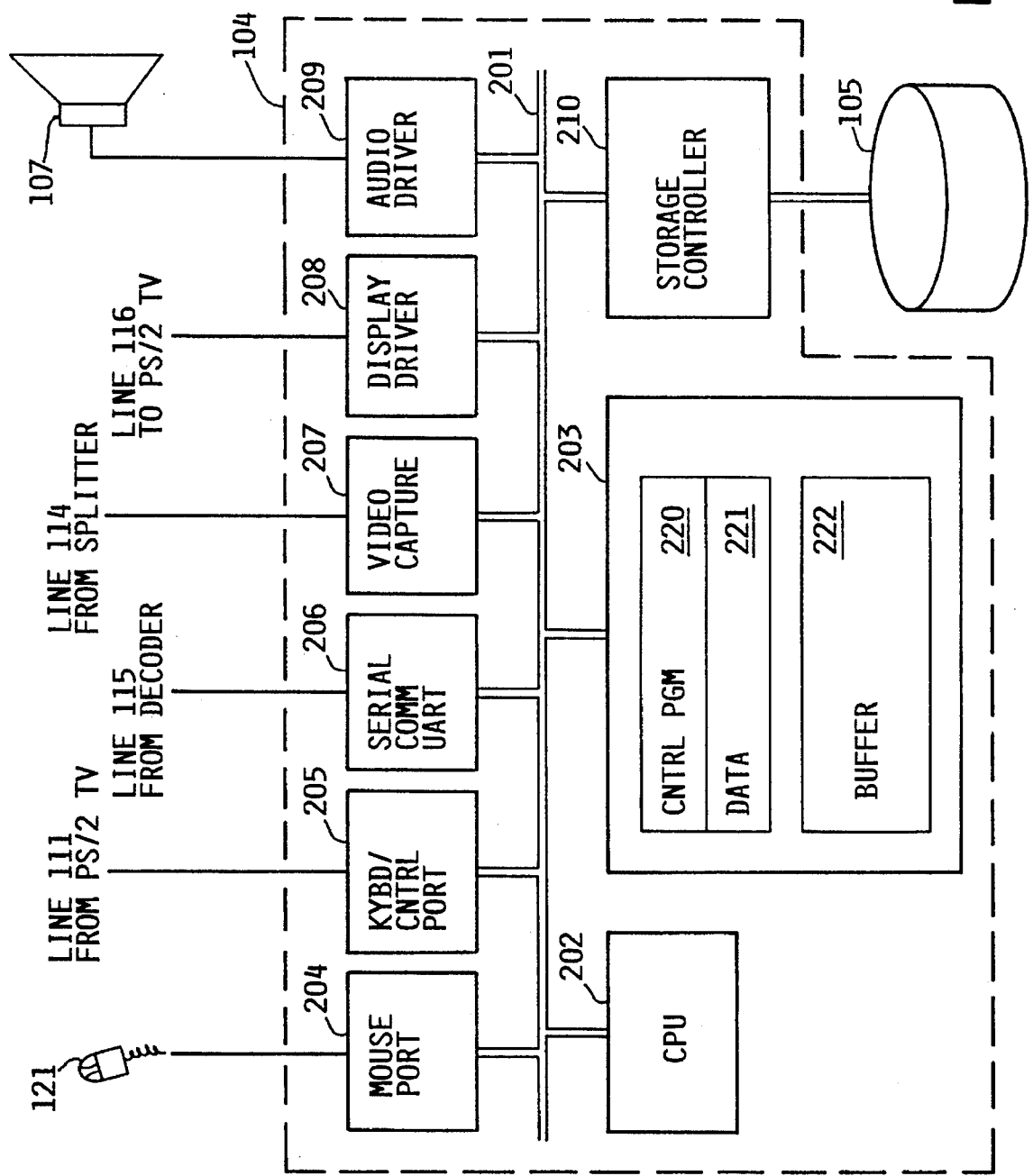
FIG. 2 shows in greater detail the major components of the computer portion of the video presentation system according to the preferred embodiment.

FIG. 2 shows in greater detail the major components of completer portion 104 of video presentation system 100. Computer 104 comprises central processing unit (CPU) 202, random access memory 203, mouse port controller 204, keyboard port controller 205, serial communications controller 206, digital video capture 207, graphic display card 208, audio driver 209 and storage controller 210, all coupled to bidirectional system communications bus 201. Bus 201 facilitates communications, i.e. transfer of data, among the various components of computer 104.

CPU 202 is a general purpose programmable processor such an an Intel 80486 processor commonly used in personal computers. Memory 203 is a random access memory sufficiently large to hold the necessary programming and buffer data. While memory 203 is shown as a single entity, it should be understood that memory 203 may in fact comprise a plurality of modules, and that memory may exist at multiple levels, from high-speed registers and caches to lower speed but larger DRAM chips. As shown in FIG. 2, memory 203 contains control program 220, data structures 221, and buffer 222. Control program comprises a plurality of machine instructions which execute on processor 202 to perform video selection, scanning and editing functions as described more fully herein. Data structures 221 comprise data which direct and customize the operation of control program 220, such as user time and channel selections, search parameters, locations of video segments of interest, etc. Buffer 222 is used for temporary storage of video signals or closed captioning data during scanning and editing by control program 220.

Mouse port controller 204 and keyboard port controller 205 facilitate input of data by the viewer from either a mouse or keyboard. In the preferred embodiment, keyboard 120 attaches to PS/2 TV 101, and keyboard signals pass through it. However, it is also possible to couple a keyboard directly to keyboard port 205. Controllers 204 and 205 are illustrative of the type of input controller commonly used for personal computers, it being understood that it would be possible to use other forms of input devices, such as joysticks, trackballs, infra-red hand-held remote control units, or even speech recognition devices.

Serial communications controller 206 comprises a conventional universal asynchronous receiver/transmitter (UART), for handling serial communications with closed captioning decoder 103 over serial digital line 115. While controller 206 is capable of bidirectional communications, in general it only receives digital data from decoder 103.

However, it may be used to transmit commands to decoder 103, e.g., to re-try a communication.

Digital video capture unit 207 is a circuit card and components which receive analog video and audio signals over line 114 and convert theme signals to a digital format suitable for storage and manipulation by digital computer 104. In the preferred embodiment, digital video capture unit 207 is an IBM ActionMedia II Display Adapter with ActionMedia II capture option.

Graphic display card 208 transmits outgoing video signals to receiver/tuner 101 over line 116, and ultimately to video display screen 106. Display card 208 receives digital signals on bus 201 and converts these to an RGB analog format or composite video analog format, suitable for receiving by display screen 106. Audio driver 209 simultaneously transmits the audio component of the television signal to speaker 107.

Storage controller 210 communicates with mass storage device 105. In the preferred embodiment, mass storage device 105 is an IBM PS/2 External Disk Array Subsystem. Such a device comprises a plurality of rotating magnetic disk drive storage devices, which are controlled by a single controller to act as a single large storage entity. Mass storage device 105 functions primarily as a buffer for storage of video and audio signals which have been digitized by capture unit 207. Due to the large volume of storage such digitized signals consume, a large external storage device is preferably employed. While only one such unit is shown, it should be understood that there may in fact be multiple mass storage devices, which may be internal or external to computer 104. Typically, computer 104 will include an internal disk drive of smaller capacity than the external disk drive array subsystem 105, on which may be stored, e.g., programs required for operation of computer 104 in accordance with the present invention or other data. It should also be understood that other forms of mass storage for video signals may be employed. In particular, it would be possible to store analog video signals on one or more conventional video cassette recorders.

Figure 3:
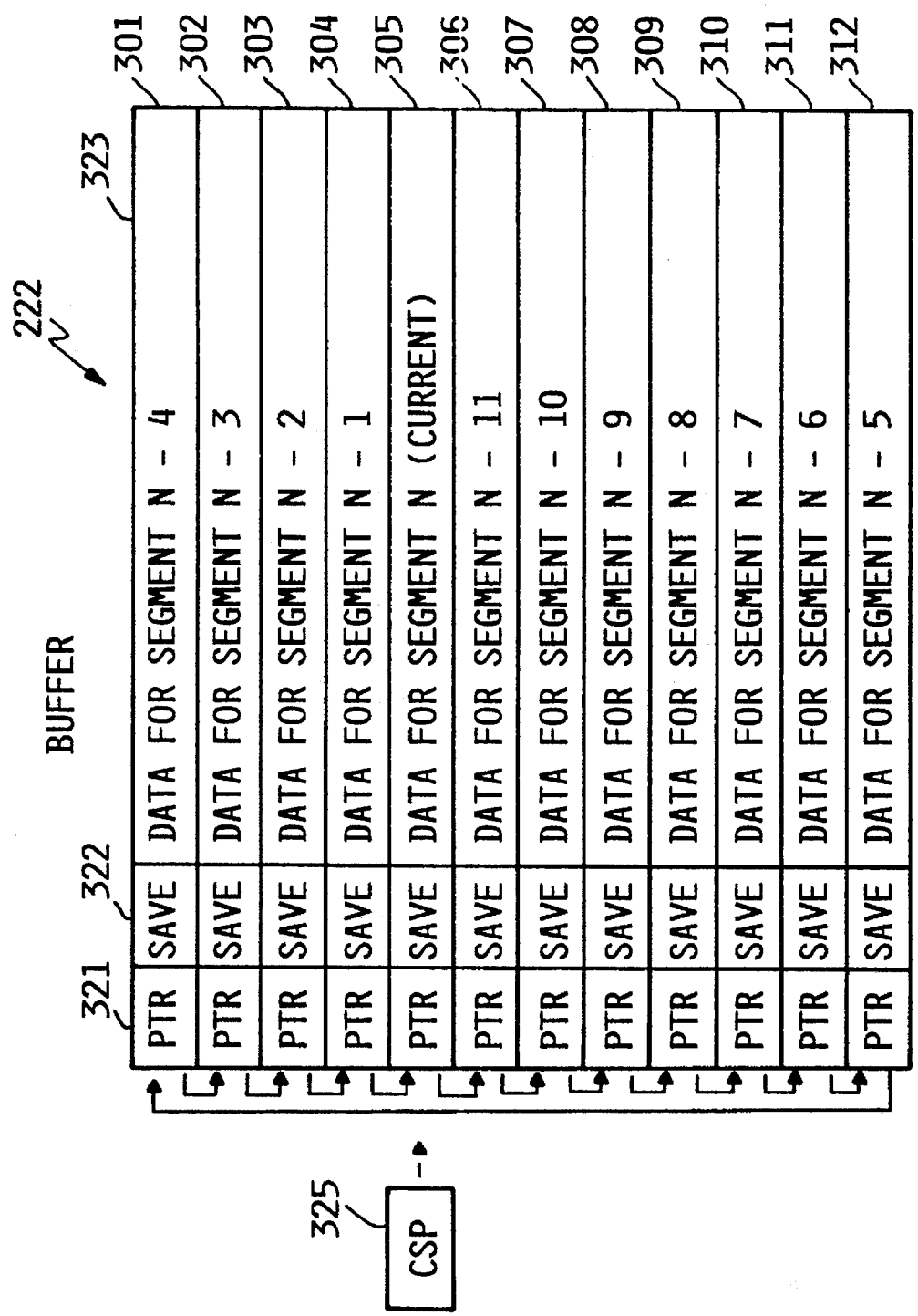
FIG. 3 shows in greater detail the structure of the video segment buffer according to the preferred embodiment.

FIG. 3 shows in greater detail the structure of buffer 222. Buffer 222 is part of a larger general purpose RAM 203. A portion of RAM 203 is allocated to buffer 222 upon initializing a certain functions as described more fully herein. Buffer 222 is allocated in a plurality of segments 301–312, which may or may not be contiguous in RAM 203. Each buffer segment is capable of holding a television signal segment from a short time period in its respective data field 323. Each buffer segment 301–312 also contains a respective pointer field 321, containing a pointer to the beginning of the next segment, and a respective save field 322, containing a flag indicating whether the segment should be saved to storage. Segment pointer 325 in data 221 points to current segment 305. Buffer 222 is preferably arranged as a circular buffer. Segment pointer 325 is "incremented" periodically as required to point to the next segment. After the last segment is reached, the pointer is "incremented" to point to the first segment again. As used herein, "incremented" refers to the fact that the pointer is set to the next segment in the circular buffer; the actual numerical address in the segment pointer may be increased or decreased. While FIG. 3 shows a buffer having 12 segments, it should be understood that the number and size of the segments may vary, and in particular that control program 220 may dynamically vary the number and size of the segments. The design and operation of such circular buffers is now in the art of computer programming.

FIGS. 4A, 4B, 4C, 4D and 4E show the format of the scan profile data structure which is used to record what type of television information the viewer wishes to identify, and to govern the operation of control program 220. Each profile record includes one profile control block 401 as shown in FIG. 4A. Profile control block 401 is the main profile record, and contains pointers which point to subsidiary records. Profile control block 401 comprises title field 402, which contains a short title of the profile for use in viewer identification. Description field 403 contains a longer textual description of the subject of the profile. Interval field 404 determines the size of an interval to be saved and recorded. It specifies the number of seconds of television signal to be saved and recorded before and after encountering a match of the search parameters. Next profile pointer field 405 and last profile pointer field 406 contain pointers to the next and previous profile control blocks, respectively. It is expected that the video presentation system of the present invention may store multiple profiles, and that these would be stored as one or more circular linked lists of variable length, as are known in the art of computer programming. Time pointer field 407 contains a pointer to the first time control block 410 to which the profile applies. Time control blocks 410 are maintained as a linked list of variable length, allowing a single profile to specify multiple time periods during which channels should be scanned for television of interest. Keyword pointer 408 contains a pointer to the first OR-ed key word control block 430. Keywords are also maintained as a variable length linked list, permitting multiple keywords and combinations of AND-OR logic, as illustrated below in respect to FIG. 5.

The format of time block 410 is shown in FIG. 4B. Each time block 410 specifies a time period during which applicable channels should be scanned for items of interest. Date or day field 411 specifies a date or day of the week for the start of the scanning period. This may be specified either as a single date, in which case the scan will be performed only once, or as a day of the week, in which case the scan will be performed every week at the same time. Date or day field 411 may also contain a special code designating "Monday through Friday" or other common combination of days, indicating that the scan is to be performed on all such days. Start time field 412 specifies the time of day at which the scan is to begin. Time end field 413 specifies the time at which the scan ends. Next time pointer 414 contains a pointer to the next time control block 410 in the list of time control blocks for the applicable profile. A null value indicates that the end of the list has been reached. Channel pointer 415 contains a pointer to the list of channels to be scanned.

The format of channel block 420 is shown in FIG. 4C. Channel block 420 is used only if multiple channel scanning is supported. Where the system is capable of scanning only one channel at a time, there is no need for a pointer to a list of channels, and field 415 of time block 410 may instead contain simply the single channel to be scanned. Where multiple channels may be scanned, provision is made for a variable length list of channels. Channel block 420 contains channel field 421, which identifies a channel to be scanned, and next channel pointer field 422, which contains a pointer to the next channel control block on the list. The final channel block on the list contains a null pointer in field 422.

The formats of OR-ed keyword block 430 and AND-ed keyword block 440 are shown in FIGS. 4D and 4E respectively. These blocks effectively specify the search parameters to be used when scanning for television data of interest. In accordance with the preferred embodiment, a user may specify one or more disjunctions of conjunctions of keywords. I.e., a user may specify a search of the form (WORD1 and WORD2) or (WORD3 and WORD4 and WORD5) or (WORD6) or . . . The number of disjunctions is variable, as is the number of conjunctions which make up each disjunction. OR-ed keyword block 430 comprises next OR-ed pointer field 431, which points to the next OR-ed keyword block of the disjunctive string; keyword 432 which contains a keyword to be matched; and next AND-ed pointer field 433, which contains a pointer to an AND-ed keyword block 440 which is part of the conjunctive string. ANDed keyword block 440 comprises number words within field 441, which specifies a maximum distance in terms of number of words between words in a conjunctive string. I.e., the words of a conjunctive string must be within a specified proximity of each other to create a true match. ANDed keyword block 440 further comprises keyword field 442, which specifies a keyword, and next ANDed pointer 443, which points to the next ANDed keyword block 440 of the string. Nulls in pointer fields 431, 433, 443 indicate the last word of the string.

Figure 5:
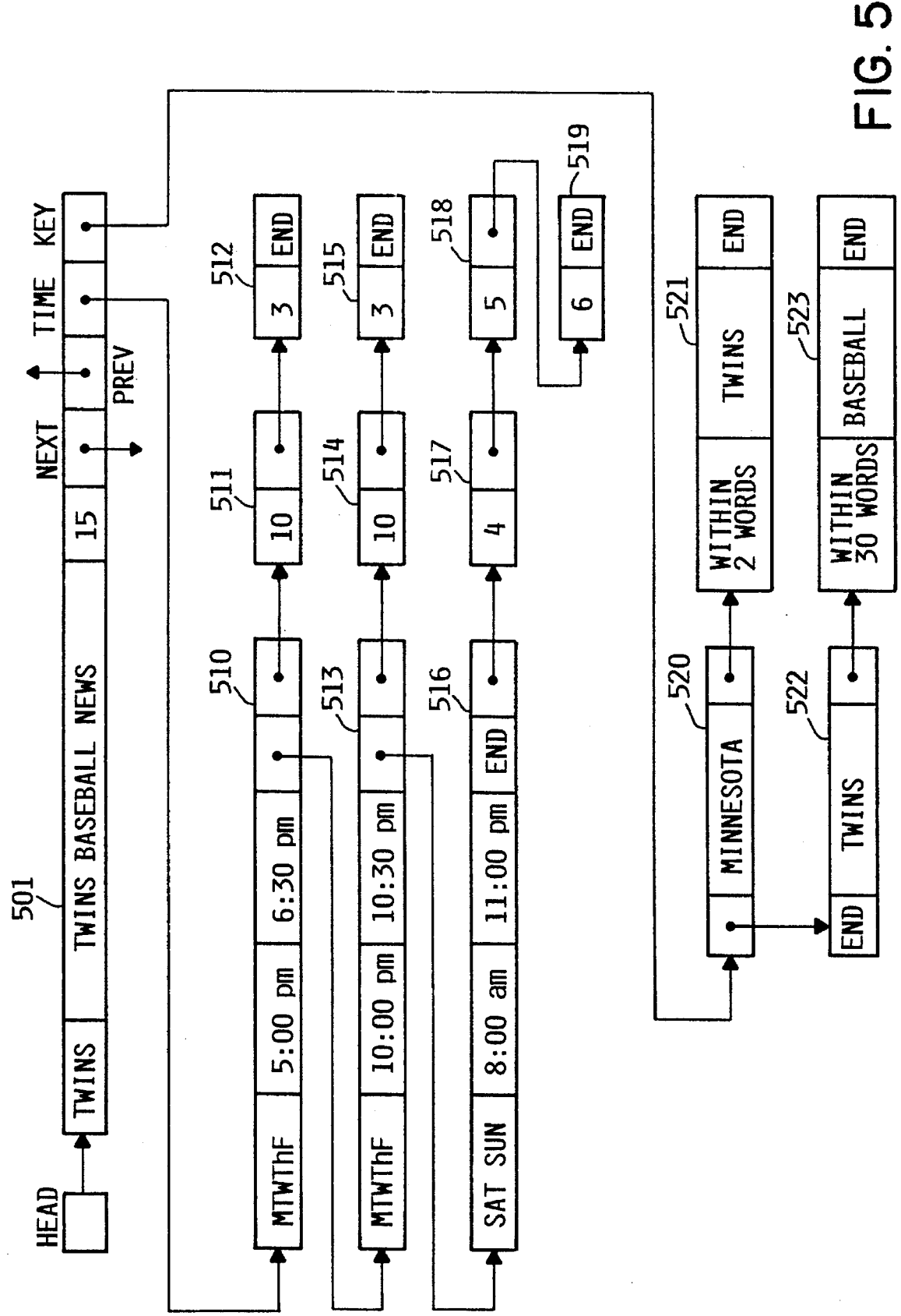
FIG. 5 is an example of how a complete set of profile data structures would be used to specify a typical scan for data of interest according to the preferred and alternative embodiments.

FIG. 5 is an example of how a complete set of profile data structures 401, 410, 420, 430, 440 would be used to specify a typical scan for data of interest. In this example, the profile is established to scan for news about the Minnesota Twins baseball team. It is desired to scan local channels 3 and 10 during the periods of normal local newscasts on weeknights, and to scan major network channels 4, 5 and 6 all weekend for items about the Minnesota Twins.

In the example of FIG. 5, reference number 501 represents a profile control block having the same structure as profile control block 401 shown in FIG. 4A. Reference numbers 510, 513 and 516 each represent a time block having the same structure as time block 410 shown in FIG. 4B. Reference numbers 511, 512, 514, 515, 517, 518 and 519 each represent a channel block having the same structure as channel block 420 shown in FIG. 4C. Reference numbers 520 and 522 each represent an OR-ed keyword block having the same structure as OR-ed keyword block 430 shown in FIG. 4D. Reference numbers 521 and 523 each represent an AND-ed keyword block having the same structure as AND-ed keyword block 440 shown in FIG. 4E.

As noted earlier, the complete set of profile data for this scan contains one profile control block 501. Title field 402 of block 501 contains the title "Twins", and description field contains the string "MN Twins Baseball News". These fields are useful in identifying the nature of the profile. Next and Last profile pointer fields 405, 406 point to additional profile control blocks (not shown) having the same structure as profile control block 401, which are used to find unrelated items of interest.

Time block pointer field 407 points to the first time block 510 of a string of time blocks. In this example, the first time block 510 is used to specify the time period from 5:00 pm to 6:30 pm on weekdays. This time period corresponds to the time for typical local newscasts. Channel pointer field 415 of block 510 points to channel block 511. Channel field 421 of channel block 511 contains a channel (channel 10) to be scanned during the time period specified by time block 510. Next channel pointer field 422 points to channel block 512. This channel block contains a different channel (channel 3) to be scanned during the same time period. Next channel pointer field 422 of block 512 contains a null pointer, indicating the end of the list of channels to be scanned at this time. Thus, blocks 510, 511 and 512 together specify that channels 10 and 3 should be scanned every weekday from 5:00 pm to 6:30 pm.

Next time pointer field 414 of time block 513 specifies another time period to be scanned. As in the case of time block 510 described above, time block 513 points to channel block 514, which in turn points to block 515. These collectively specify that channels 10 and 3 are to be scanned every weekday from 10:00 pm to 10:30 pm. Although the strings of blocks starting at 511 and 514 are shown separately in FIG. 5 for clarity, it should be understood that they may in fact be a single string of channel blocks, which is pointed to by both time blocks 510 and 513.

Next time pointer field 414 of time block 513 points to time block 516, which specifies still another time period to be scanned. Block 516 specifies a scan on Saturday and Sunday, from 8:00 am to 11:00 pm. Next time pointer field 414 of block 516 is null, indicating the end of the string of time blocks 510, 513, and 516. Channel pointer field 415 of block 516 points to channel block 517, which specifies channel 4. Channel block 517 points to channel block 518, which in turn points to channel block 519, specifying a list of three channels, channels 4, 5 and 6, to be scanned during the time period specified by time block 516.

Keyword pointer field 408 of profile control block 501 points to the first OR-ed keyword block 520. OR-ed keyword block 520 contains the keyword "Minnesota" in keyword field 432, and contains a pointer to AND-ed keyword block 521 in next AND-ed ptr field 433. AND-ed keyword block 521 contains the keyword "Twins" in keyword field 442, and contains the number 2 in field 441, specifying the maximum distance of the keywords. Next ANDed pointer field 443 of block 521 is null, indicating the end of the string of ANDed keywords. Blocks 520 and 521 together specify a search for the keywords "Minnesota" and "Twins", and specify that these words must be within two words of each other in a text string. Thus, the text "Siamese twins were born at Lake Wobegone, Minnesota" would not satisfy the search parameters specified by blocks 520 and 521 because the words "twins" and "Minnesota" are more than two words apart in the string, whereas "The Minnesota Twins lost to Kansas City last night" would satisfy the search parameters.

Typically, closed captioning text is in all capital letters; the sample text above is shown in mixed case for ease of understanding. However, even if text is presented in mixed case, the search parameters are preferably not case sensitive, i.e., search words match regardless of whether the letters are upper or lower case.

Next OR-ed pointer field 431 of block 520 points to block 522, which specifies another string of keywords. Block 522 contains the keyword "Twins" in keyword field 432, and a pointer to AND-ed keyword block 523 in field 433. AND-ed keyword block 523 contains the keyword "Baseball" in field 442, and the keyword distance 30 in field 441. A null pointer in field 443 of block 523 indicates the end of the conjunctive string. Blocks 522 and 523 collectively specify a search for the keywords "Twins" and "Baseball", which must be located within 30 words of each other in a text string. Next OR-ed pointer field 431 of block 522 is null, indicating the end of the string of OR-ed keyword blocks (disjunctive string). In this example, two separate and independent (disjunctive) conditions are specified, the first by blocks 520-1, the second by blocks 522-3. If a decoded closed captioned text string satisfies either condition, the search parameters are said to be satisfied and appropriate action will be taken to save or otherwise deal with the video interval in which the string satisfying the search parameters was found, as more fully described below.

The operation of the present invention in the preferred embodiment will now be described. Control program 220 is the heart of the operation, and controls computer 104 and other hardware shown in FIG. 1. Control program 220 comprises four basic functions, a set profile function, a capture function, a scan function, and a review/edit function.

In order to perform certain functions, control program 220 requires interactive input of the viewer. Video presentation system 100 preferably displays prompts, lists of choices, and other required information on display 106. Information in text form required for viewer selections may be overlayed on any video picture being displayed on display 106, permitting the viewer to interactively input information while a television program is simultaneously being displayed on display 106. Apparatus for overlaying such textual information is known in the art. Alternatively, it would be possible to display such textual information on display 106 by itself, without any other video picture, or in a window of display 106 while a television program is being shown on the remainder of the display, or on a separate special purpose display, such as a small light emitting diode (LED) display.

Figure 6:
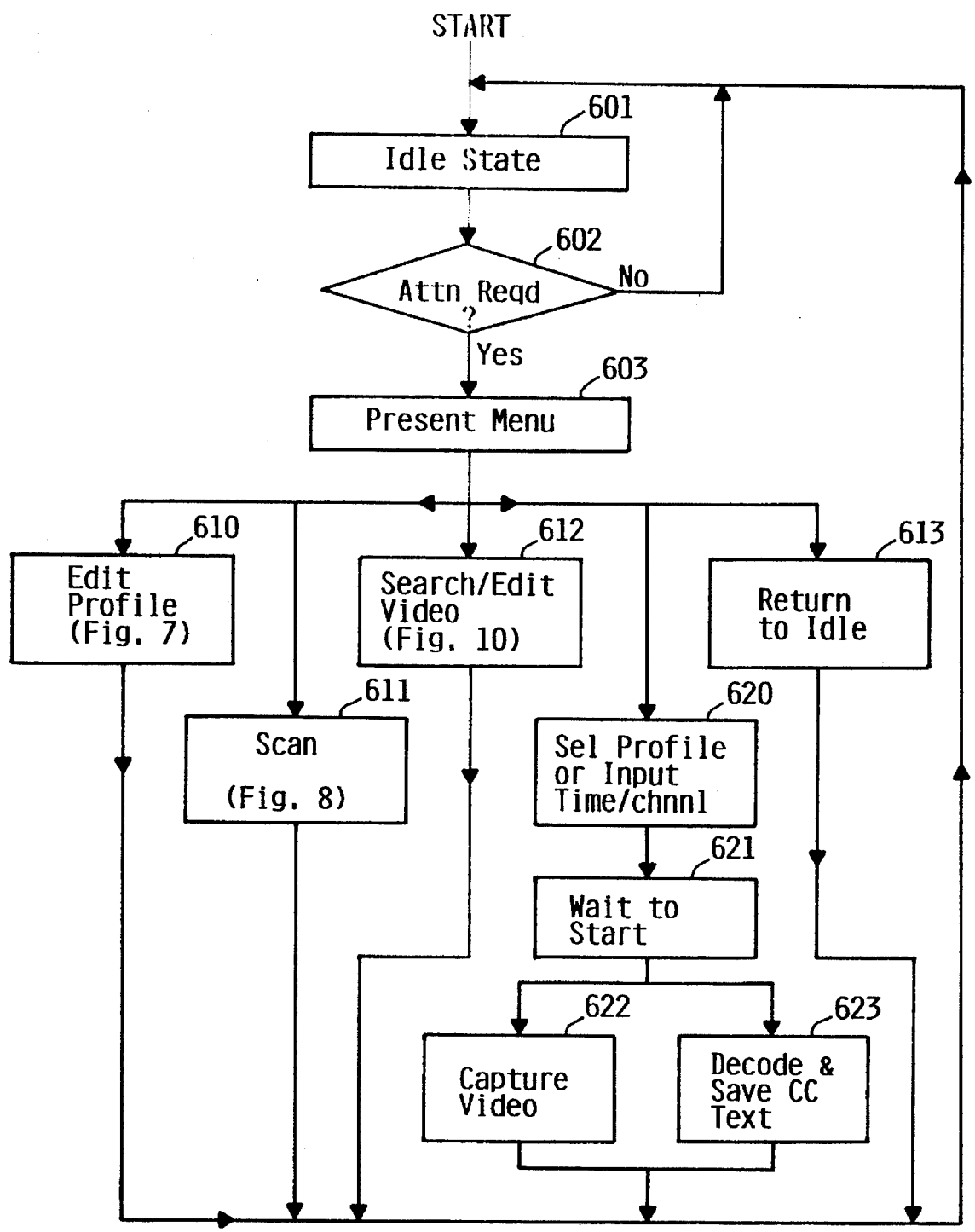
FIG. 6 shows the high level flow of control of the control program according to the preferred embodiment.

FIG. 6 shows the high level flow of control of control program 220. Upon power first being applied to video presentation system 100, control program 220 enters idle mode at block 601. Control program 220 waits in idle mode until the user demands attention, as for example, by pressing an appropriate function key on keyboard 120, or a button on mouse 121 (block 602). Control program responds by displaying a menu of available choices on display 106 or a special purpose display, as explained above, at block 603. The available choices are to edit a profile (block 610), to scan incoming television signals in accordance with a profile (block 611), to search and edit a stored video signal (block 612), and to capture and save incoming television signals for later viewing and/or editing (blocks 620–23). The user may also choose to return to idle mode (block 613). The user selects one of the available choices, and upon completion of the selection, control program 220 either returns to idle mode or to the menu of choices, as illustrated. The steps required to perform the edit profile, scan, and search/edit video functions (blocks 610–612) are explained in greater detail below with reference to FIGS. 7–10.

To perform the capture and save function, the video presentation system must be instructed as to the time interval and channel(s) to be captured and saved. When this option is selected, control program presents the viewer with a list of available profiles to select at block 620. These profiles specify channel(s) and time(s) for capture of the signal. The viewer may optionally specify a channel and start and stop times, without creating a profile. Upon receiving the viewer's selection, control program 220 waits at block 621 until the specified start time for video capture. At the start time, control program 220 captures the video and text. I.e., it commands digital tuner 101 to tune the appropriate channel, and instructs video capture unit 207 to receive and digitize the analog signal from tuner 101 and send it directly to storage controller 210 via bus 201 to be stored in storage 105 (block 622). At the same time, decoder 103 decodes closed captioning data, which is received by serial UART 206 and also stored directly in storage 105 (block 623). At the end of the specified capture period, control program 220 returns to idle mode The television signal thus digitized and stored can be later edited using the search/edit function, or simply played back.

Figure 7:
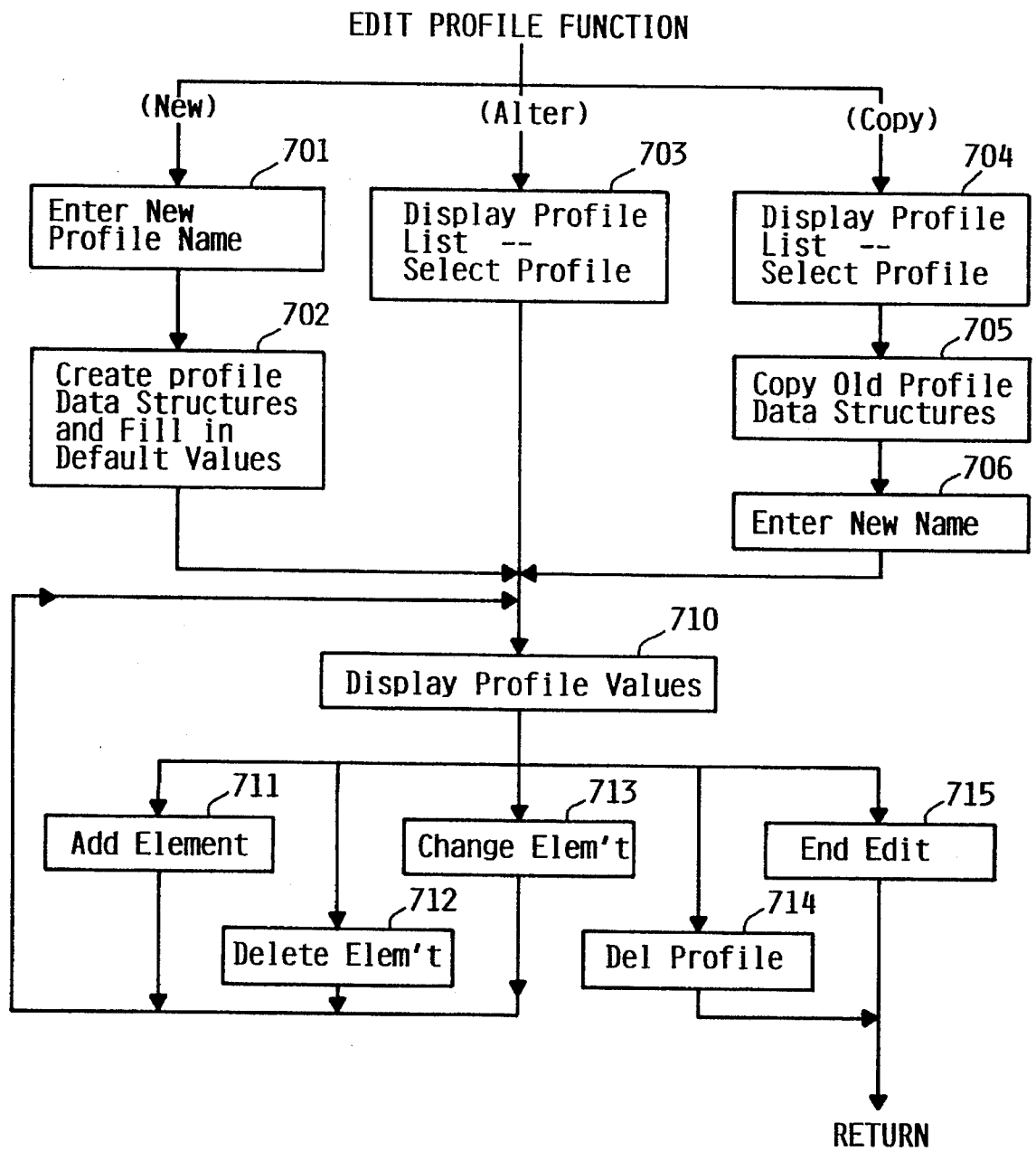
FIG. 7 shows the steps performed by control program 220 as part of the edit profile function according to the preferred embodiment.

FIG. 7 shows the steps performed by control program 220 as part of the Edit Profile function. The Edit Profile function allows a viewer to create or alter a profile data structure. The profile data structure specifies such things as channels and times to be monitored, size of capture windows, key words used and search parameters and logical relationships between these key words, etc., as explained above. When a viewer selects the set profile function, e.g. by keyboard 120 or mouse input device 121, monitor program 220 displays a menu of available choices, which include to create a new profile from scratch, to edit an existing profile, or to copy an existing profile as a template for creating a new profile. If the user elects to create a new profile from scratch, control program 220 prompts the user to enter the new profile name at block 701. It then creates the new profile data structures explained above and depicted in FIGS. 4A–4E, and enters default values in the appropriate fields, at block 702. If the user elects to edit an existing profile, control program 220 displays a list of existing profiles and receives the user's selection at step 703. If the user elects to copy an existing profile as a template, control program 220 displays the list of existing profiles and receives the user's selection at step 704. It then creates new profile data structures as depicted in FIGS. 4A–4E, and copies the values from the selected profile into the new profile data structures, at step 705. Program 220 then prompts the user to enter the name of the new profile, in order to distinguish it from the profile from which it was copied, at step 706.

Upon completing the initial creation, selection or copying of a profile as explained above, control program 220 displays the profile values at step 710. The user may then select any of various editing options. The user may add an element (block 711), as for example adding a time period to be scanned or adding a search word. The user may delete such an element (block 712). The user may change such an element (block 713). Each time the user adds, deletes or changes an element, control program returns to block 710 to display the altered profile. The user may also delete an entire profile, which would delete all associated data structures depicted in FIGS. 4A–4E (block 714). When done editing, the user chooses to end the editing function (block 715).

Figure 8A:
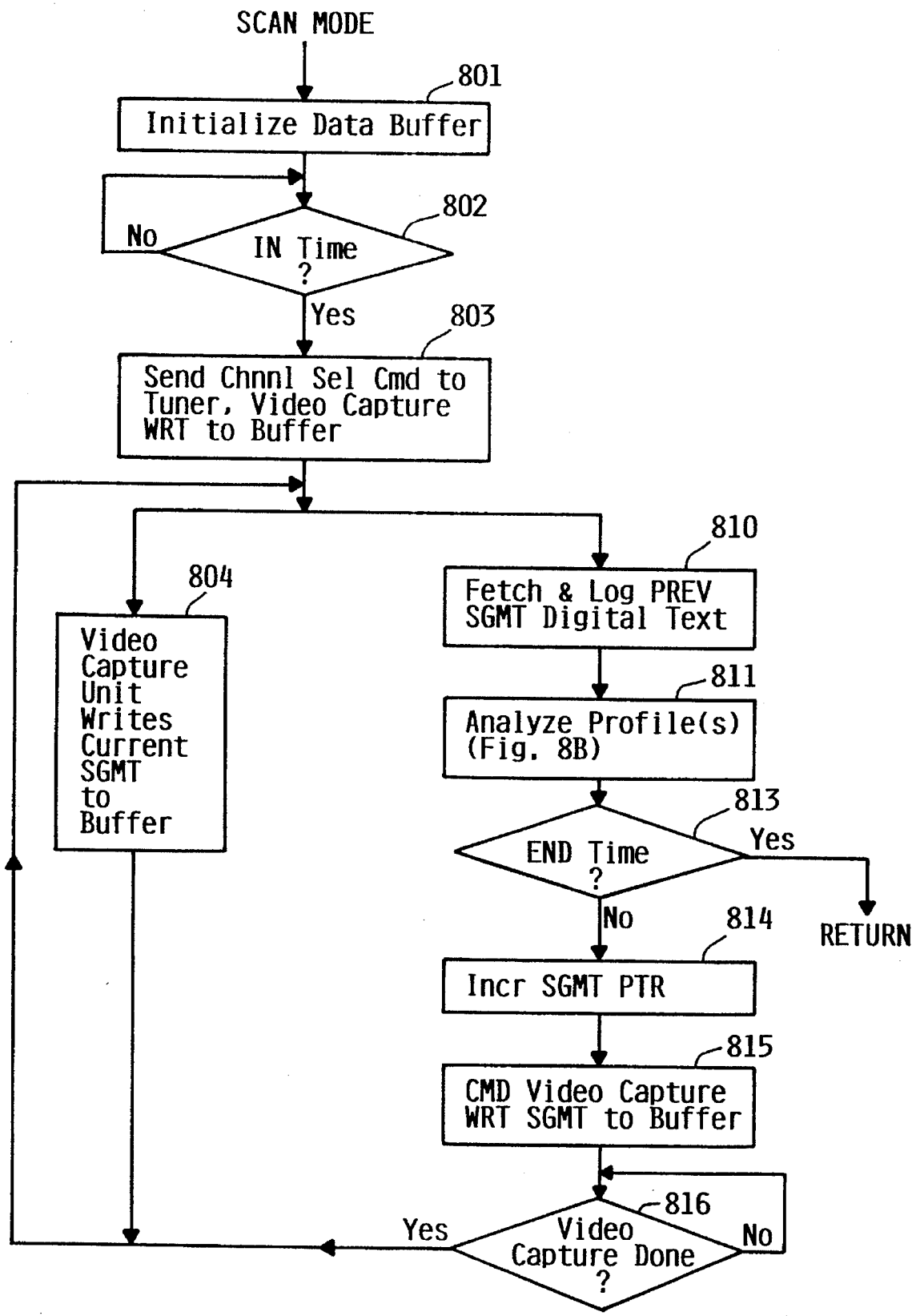
FIGS. 8A and 8B show the steps required to scan a received signal for items of interest according to the preferred embodiment.
Figure 8B:
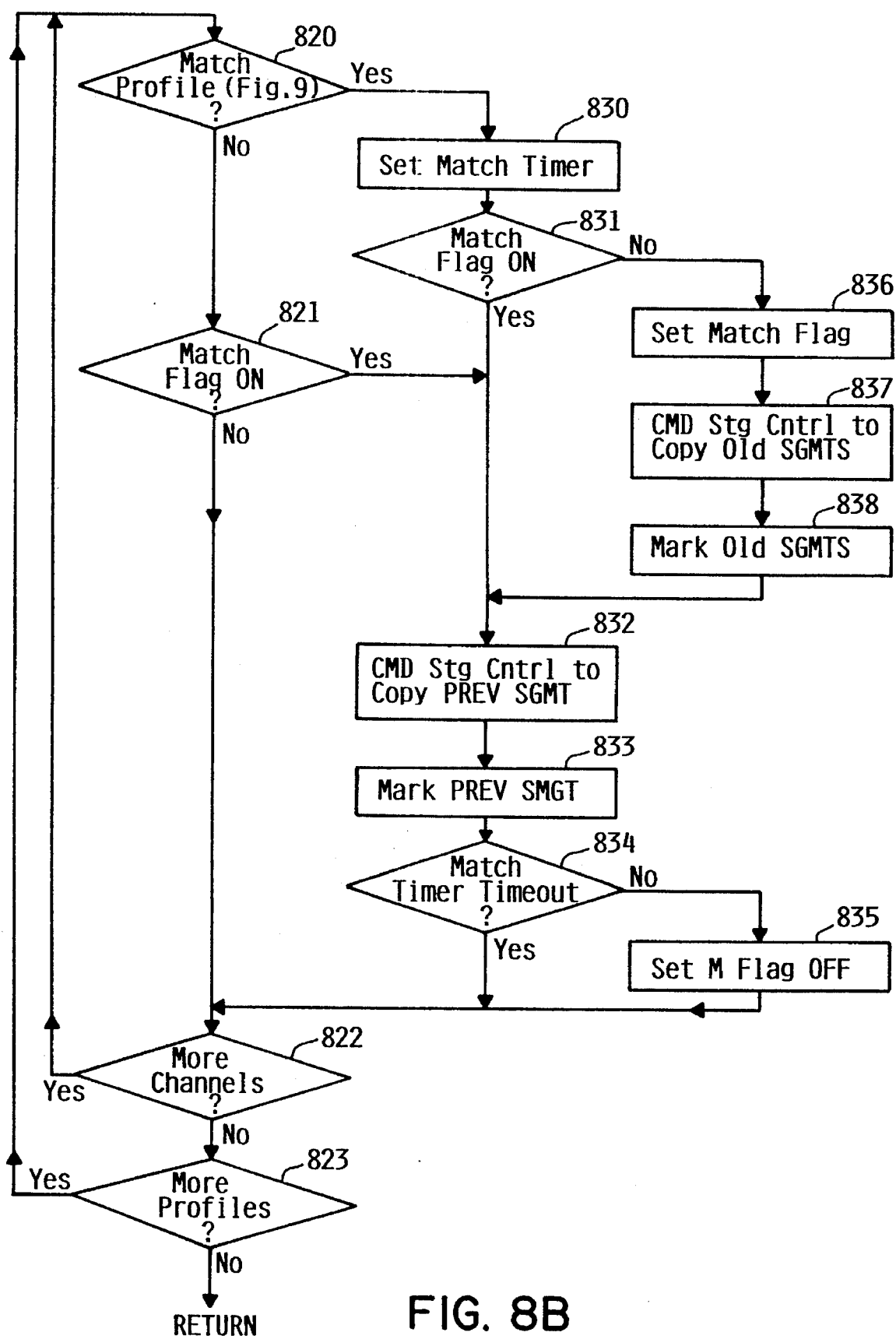

In accordance with the preferred embodiment, the video presentation system can operate in automatic scan mode to automatically find and record television signals of interest without a human operator's attendance during signal reception. FIGS. 8A and 8B illustrate the operation of the presentation system while in automatic scan mode. More particularly, FIGS. 8A and 8B illustrate the steps performed by control program 220 executing on CPU 202 of computer 104.

Upon entering automatic scan mode, control program 220 performs necessary initialization of data 221 and buffer 222 at step 801. Because buffer 222 is part of a larger general purpose RAM 203, initialization requires allocation of a portion of RAM 203 to buffer 222. Buffer 222 will be allocated in a plurality of segments 301–312, each buffer segment holding a television signal segment from a short time period. This time period is "short" in relation to human perceptions and viewing time. In relation to the operation of a digital computer it must be sufficiently long to permit computer 104 to perform the steps shown in FIGS. 8A and 8B. This time period may, for example, be in the vicinity of 2 seconds. Segment pointer 325 is initialized to a first of such segments.

For monitoring and storing television signals in real time in accordance with the preferred embodiment, the number and size of segments in buffer 222 must be sufficiently large that an interval of the specified size can be captured. For example, if it is desired to capture an interval of television signal beginning 15 seconds before closed captioning data matching a set of search parameters is encountered, then buffer 222 must be sufficiently large to hold 15 seconds of digitized television signal. If each segment holds 2 seconds of televised signal, then buffer 222 should hold a minimum of 9 segments. One extra segment is needed to account for the fact that control program 220 is analyzing a segment previous to the one being currently recorded. Control program 220 allocates a buffer of appropriate size based on scanning parameters.

Alternatively, in certain applications it may be desirable to record much larger intervals. For example, a viewer may wish to save an entire half-hour program if a set of search parameters is satisfied anywhere within the program. The set of search parameters may even require a count of frequency of occurrence of some condition, so that the program should be saved only if the condition is met a specified number of times. In this case, computer 104 may be unable to determine that the television program should be saved until the transmission is nearly finished. Because this may require buffers of extremely large size, computer 104 could alternatively save the entire television program in storage 105 while it is being transmitted, analyze the closed captioning data as described herein, and delete the program from storage 105 after transmission of the program is complete if the specified conditions are not met.

After the buffer and data initialization functions have been performed, control program 220 waits in a loop for the start time at step 802. The start time, i.e., the time to begin receiving and monitoring a television signal, is specified in a profile data structure Multiple profile data structures may exist, each specifying a certain start time. While waiting at step 802, the control program repeatedly compares the various start times in the profile data structures with an internal clock. When the internal clock reaches the first start time, the control program exits the wait loop. If multiple profile data structures exist, control program 220 will periodically check whether the respective start time of each has arrived and respond appropriately; for brevity of illustration, this is not shown in FIG. 8A.

To start monitoring and capture of video signals, control program 220 sends a channel select command to receiver/tuner 101 over control/keyboard line 111 at step 803. The channel select command specifies a television channel to be monitored, the channel being the one specified in the respective profile data structure containing the start time which has been triggered Digital receiver/tuner 101 responds to the channel select command by tuning the specified channel and transmitting the tuned, demodulated television signal on analog signal line 112. At the same time, control program 220 sends a command to video capture unit 207 to begin receiving video signals over line 114, and to write the digitized video signals into the current segment in buffer 222 (as being pointed to by current segment pointer 325).

If the profile specifies that multiple channels are to be scanned, control program 220 will command tuner 101 to cycle through the channels of interest, thus obtaining closed captioning text from multiple channels. Because the amount of closed captioning text is relatively small, and is intended to be displayed on a television for a time interval which is relatively long compared to the time required for digital hardware to decode the closed captioning signal, it is possible for a single tuner to obtain samples from multiple channels by cycling through the channels and decoding the closed captioning signal. However, in this case it is not possible for the hardware shown in FIG. 1 to save the video signal from multiple channels simultaneously. In other words, multiple channel scanning is possible, but not multiple channel saving of video. If an item of interest is found, video from that channel can be saved upon detection of the match with the search parameters specified in the profile. Depending on the application, this small delay to start saving the video segment may be acceptable to the viewer. In the multiple channel hardware alternative embodiment described more fully below, control program 220 will command the appropriate tuning hardware to monitor the specified multiple channels, enabling multiple channels to be saved.

Computer 104 simultaneously captures the current video segment and analyzes the previous video segment. These concurrent processes are illustrated in FIG. 8A by the divergent lines of flow going to blocks 804 and 810. As represented by block 804, video capture unit 207 receives the demodulated analog television signal from tuner 101 and splitter 102 over line 114. Capture unit 207 converts this signal to digital form, and transmits the digitized signal data over bus 201 to buffer 222. Data is preferably transferred in a direct memory access (DMA) operation requiring no intervention by CPU 202, as is known in the art of computer architecture. Because video capture unit 207 receives television signals in real time, it can not write data to buffer 222 any faster than the data is received over line 114. A 2-second television segment requires 2 seconds for capture unit 207 to receive and write to buffer 222. While this is a relatively short interval in terms of human viewing time, it is more than long enough for a computer to perform the sleds shown in blocks 810–828. These steps are performed by control program 220 executing on CPU 202 while video capture unit 207 captures the signal.

As depicted by block 810, control program 220 first fetches the closed captioned digital text stream associated with the previous segment of video. This is the text stream extracted from the closed captioning portion of the television signal by closed captioning text decoder 103. This text stream is transmitted by decoder 103 to computer 104 over serial line 115. Serial communications controller 206 handles communication of data over line 115. Received text is saved in a log record (not shown) in storage 105, having timestamps or other means to correlate the received text to a particular video interval from which it came. Additionally, the most recent text will be required for analysis. Because the amount of closed captioning text contained in a typical video interval is relatively small, the recent text required for analysis may be stored in a small buffer (not shown) in controller 206, or in a section of memory 203. Where multiple channels are being scanned, a separate text log and temporary buffer would be required for each channel being scanned.

Control program 220 next analyzes the text stream(s) with respect to the active profile(s) at step 811. Step 811 is broken out in greater detail in FIG. 8B, as described below.

Referring to FIG. 8B, control program 220 compares a logged in text stream against the parameters of a profile to determine whether the text stream matches search criteria specified in the applicable profile at step 820. In the preferred embodiment, the search criteria comprises one or more keywords connected by logical relationships. The steps required to form a determination as to whether a match exists are represented in FIG. 9.

Figure 9:
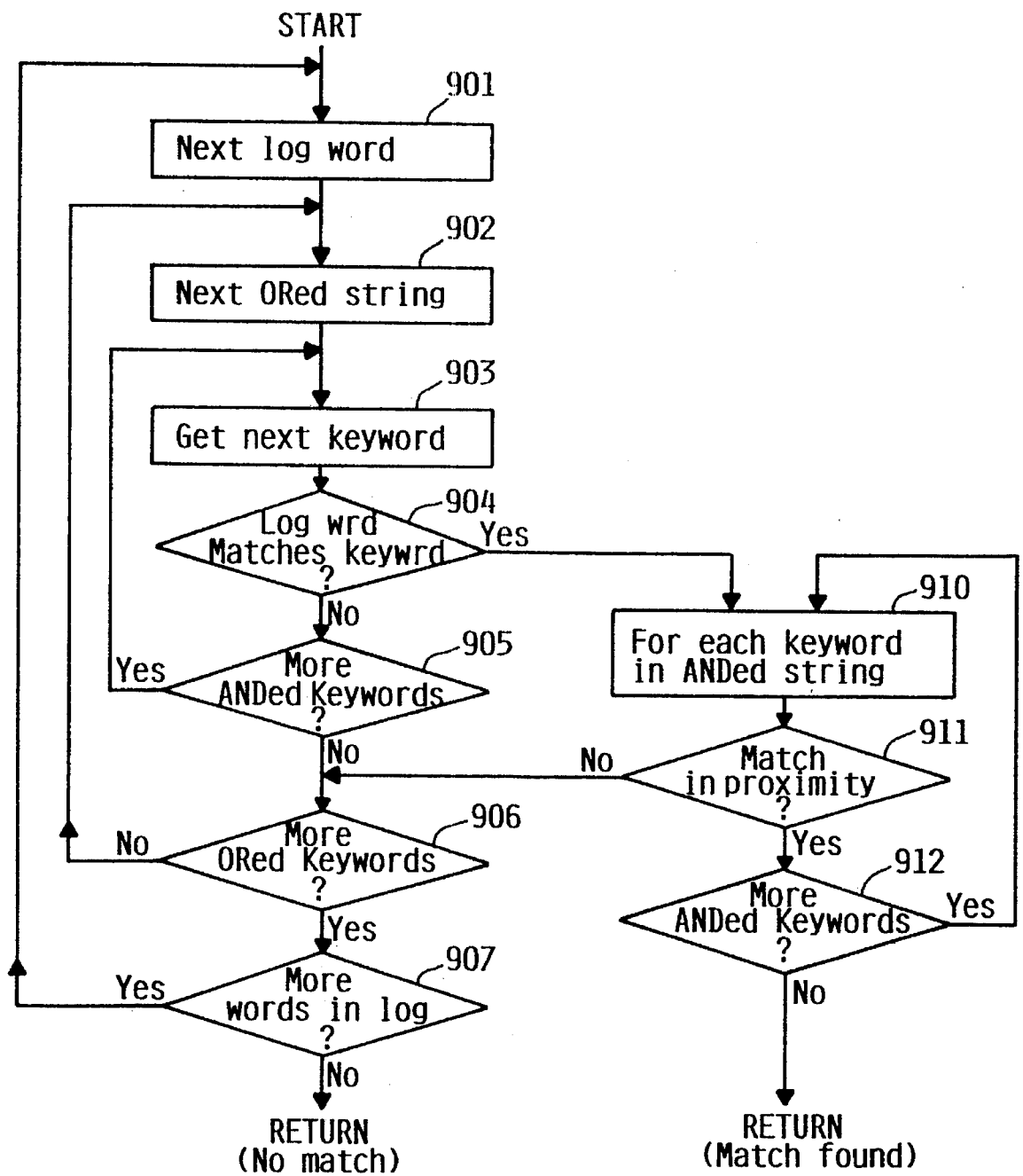
FIG. 9 shows the steps required to determine whether a sequence of words in a log of closed captioning text matches the search parameters specified by the profile data structures according to the preferred embodiment.

Referring to FIG. 9, a determination whether a match exists is made by scanning each keyword in an ORed keyword block 430 or ANDed keyword block 440 for a match against each word in the log of closed captioning text. Words in the log of closed captioning text are selected serially for matching at step 901. Control program 220 accesses profile control block 401 to obtain the keyword block at the head of the first conjunctive string (the various conjunctive strings of keywords being ORed together to form disjunctive strings) at step 902. Referring to the example of FIG. 5, ORed keyword block 520 is the first keyword block obtained. Control program 220 obtains the keyword from the appropriate keyword block for matching at step 903. In this example, keyword "Minnesota" is obtained the first time through the loop.

At step 904, control program compares the keyword obtained from the appropriate keyword block with the current word in the log of closed captioning text to determine whether the two words match. A "match" does not necessarily mean each character of the two words is identical. The keyword may optionally contain wildcard characters to broaden the scope of matches. For example, a wildcard character such as "#" may be used to indicate a variable number of letters of any kind. Such a wildcard character would normally be attached to a root word in order to match on the root and any variant of the root. For example, a keyword of "truck#" would detect a match not only for a logged word of "truck", but also for "trucks", "trucked", "trucking", "trucker", etc. Use of such wildcard characters is known in the art of computer database searching.

If the keyword and the current logged word being analyzed do not match, control program 220 then determines whether there are any additional keywords in the conjunctive string at step 905. If so, control program 220 loops back to step 903 to get the next keyword in the string. In the example of FIG. 5, control program 220 would fetch the keyword "Twins" from ANDed keyword block 521. When all the keywords of a single conjunctive string (e.g., blocks 520 and 521) have been compared to the current logged word, control passes to block 906.

At step 906, control program 220 determines whether there are any more conjunctive strings of keywords to compare against the current logged word. If so the control program loops back to step 902 to get the head of the next conjunctive string, and proceeds through blocks 903–905 to compare each keyword of the string to the current logged word. In the example of FIG. 5, blocks 522 and 523 constitute the next conjunctive string.

When all conjunctive strings have been compared against the current logged keyword, control program proceeds to step 907 to determine whether any more words from the log of closed captioning text remain to be compared to the keywords. If so, the control program loops back to step 901 to get the next word in the log. When all words in the log have been analyzed without finding a match, control program 220 returns with a determination that no match has been found.

If, while traversing the keyword blocks, control program 220 determines at step 904 that any current logged word matches a keyword, it must then determine whether all the keywords in the same conjunctive string are matched by some word in the log of closed captioning text (in order to satisfy the logical AND condition). The words in the closed captioning text must be within the proximity limit specified in proximity field 441 of ANDed keyword block 440. Control program 220 therefore obtains each keyword in turn from the conjunctive string (step 910), scans the P most recent words of the closed captioning log to determine whether a match exists, where P is the proximity limit specified in field 441 (step 911), and determines whether all keywords in the conjunctive string have been compared to the log (step 912). If any keyword fails to match a word in the log at step 911, the conjunctive string as a whole does not match the log and control program proceeds to step 906 to determine whether any additional conjunctive strings remain to be analyzed. If all keywords in the conjunctive string are compared to the log at step 911, and a match is found for each one, then the "N" branch from block 912 will be taken at the end of the string, and control program returns with a determination that a match of closed captioning text with search parameters has been found.

If control program 220 following the logic depicted in FIG. 9 determines at block 820 that no match exists, it then checks at step 821 whether a match flag is set on. The match flag indicates that a match has been found in a previous recent segment, i.e., one within the limits of the interval specified in interval field 404 of profile control block 401. If the match flag is off, there has been no match of the search parameters in any recent segment, and control proceeds to block 822 or 823. If the match flag is on, the segment being analyzed must be saved, and control proceeds to block 832.

If control program 220 determines at block 820 (following the logic depicted in FIG. 9) that a match exists, it then sets a match timer to the interval length specified in interval field 404 of profile control block 401 at step 830. The match timer is set regardless of whether the timer is currently active. The control program then checks the status of the match flag at step 831. If the match flag is off, no match has been found within the time specified by the interval. In this case, it is necessary to first save all earlier segments within the interval specified by interval field 304 which have not already been saved. Control program first sets the match flag on at step 836. It then scans all earlier segments currently in the buffer and recorded within the interval to identify which ones are not "marked", and commands storage controller 210 to save all such segments in storage 105, at step 837. Control program 220 then marks all segments it has identified to be saved by setting save flag field 322 at step 838. The purpose of marking segments is so that they are not saved again. Control then proceeds to block 832.

Storage controller 210 has direct memory access capability. In response to a command from control program 220 to store a segment issued at step 837, controller 210 independently and asynchronously retrieves the specified segment from buffer 222 and stores it in storage 105. Once control program 220 has issued the command to storage controller 210 to store the segment, control program 220 need no longer supervise the operation, and may continue processing on the assumption that the segment will be stored in parallel with further processing in CPU 202.

If at block 831, the match flag is on, control program 220 has detected a second match within the interval. In this case, it is presumed that the control program has already caused storage controller 210 to save those segments earlier than the segment being analyzed ("previous" segment). Accordingly, steps 836–838 are not performed, at control flows directly to block 832.

Block 832 is reached because the match flag is on, indicating that the segment being analyzed, i.e. the previous segment, should be saved to storage. In this case, control program 220 issues the appropriate command to controller 210 to save the previous segment at step 832, and then sets save flag 322 to mark the previous segment at step 833 so that it will not be saved again.

At block 834, control program 220 checks to see whether the match timer has timed out, indicating that the time specified in interval field 404 has elapsed since the last match of the search parameters was encountered. If the timer has timed out, the match flag is reset (set to 'off') at step 835, so that no further segments will be saved unless another match of the search parameters is encountered. Control then proceeds to block 822 or 823.

Block 822 is applicable only if multiple channel scanning is in effect. In this case, control program 220 will return to block 820 to perform steps 820-1 and 830-8 for each channel specified in the profile, if more than one channel is being monitored. A separate match flag and timer will exist for each channel being monitored. When the text streams from all channels have been analyzed, control proceeds to block 823.

At block 823, control program 220 will return to block 820 to repeat steps 820-2 and 830-8 for each separate profile. When all profiles have been analyzed, control returns to block 813 of FIG. 8A.

At block 813, control program 220 checks an internal system clock to determine whether the time specified in time end field 413 has passed. This time indicates the end of the scanning period. If the time has passed, control program 220 exits scanning mode and returns to the main control loop shown in FIG. 6. Where more than one profile is active and being used in the scan, scanning will end for each profile independently, so that control program does not return from scan mode until the last time specified in any profile. If the time has not yet passed, control program "increments" the segment pointer at step 814. It then issues a command to video capture unit 207 to place the next segment (after the current segment) of digitized video in buffer 222 at the location pointed to by the segment pointer at step 815. Control program then waits at step 816 until video capture unit 207 is done decoding and storing the current segment in the buffer. When capture unit 207 is done with the current segment, control program loops back to block 810 and begins processing the segment which capture unit 207 has just decoded and placed in the buffer.

Typically, automatic scan mode as depicted in FIGS. 8A and 8B will be used to scan and record short segments of interest for later viewing. When the viewer is ready to view the saved segments, he merely commands video presentation system 100 to play the segments on television monitor 106. To play the stored segments, presentation system 100 retrieves the saved segments from storage 105, converts the stored digitized signal to an analog television signal with display driver 208, and transmits the analog television signal via signal line 116 to tuner 101 and ultimately to monitor 106. During playback, the audio portion of the stored digitized television signal is converted to analog by audio driver 209 and output on speaker 107.

Figure 10:
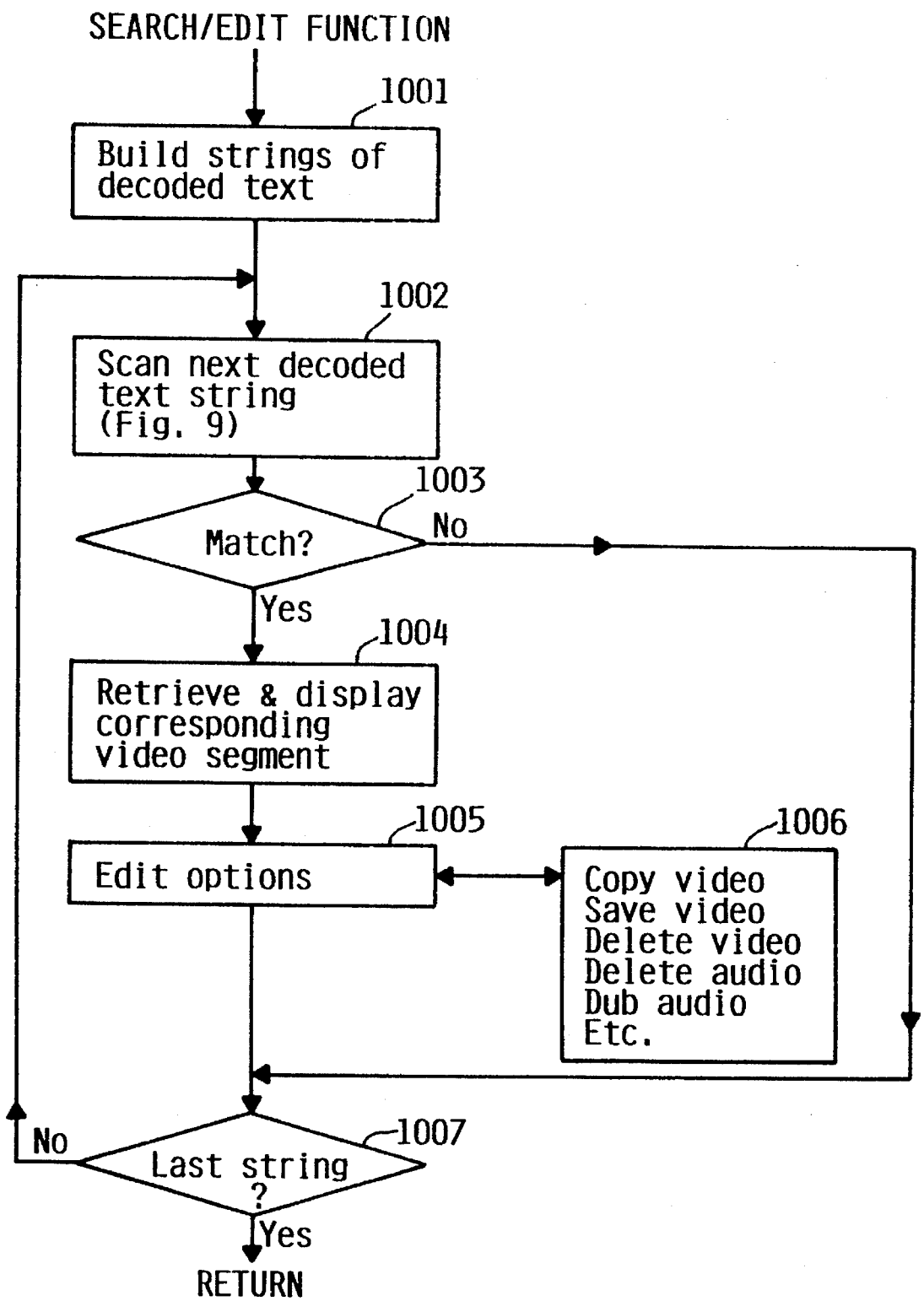
FIG. 10 shows the steps required to search and edit a signal according to the preferred embodiment.

Video presentation system 100 of the present invention is further capable of operating in a search/edit mode, as depicted in FIG. 10. Unlike automatic scan mode, search/edit mode is intended as an aid to manual editing of the signal. Specifically, search/edit mode uses techniques similar to those used in automatic scan mode to scan a television program and locate segments that the viewer may wish to edit. Once these segments have been located, the viewer may edit the television program by using any of various conventional editing techniques.

When operating in search/edit mode, video presentation system 100 must first extract and build strings of text decoded from the closed captioning stream at step 1001. This may be done in a variety of ways. In ode option, the closed captioning stream can be decoded and saved as strings of text simultaneously with the reception and storage of a broadcast television transmission. The stored television program is later edited in search/edit mode. In a second option, a recorded program can be scanned from beginning to end to extract and decode the closed captioning stream, building the strings of text. This step could be performed by the video presentation system without the need for the viewer to be monitoring the process, so that even if it requires playing the entire program from start to finish, the viewer is freed from the tedious task of monitoring. This second option would be useful, e.g., for scanning a pre-recorded videocassette. In a third option, the extracting and decoding of the text stream could be performed in small segments, concurrently with the other steps shown in FIG. 10. This option would be feasible only where the video signal is stored in a format which permits rapid access to the closed captioning data without the need to play back the entire video presentation in real time (e.g. where it is stored in digital format).

Once the text strings have been built from the closed captioning data stream, control program 220 executing on CPU 202 attempts to match each text string with the keyword search parameters specified by an appropriate profile control block 401 at step 1002. This matching step is essentially the same as that performed when in automatic scan mode, and shown in FIG. 9. If a match is detected 1003), control program 220 causes storage control 210 to retrieve a segment of video at which the match was detected from storage 105, and display the video segment on monitor 106 (step 1004).

At this point, the video presentation system has identified a video segment of interest to the viewer, and displayed it on monitor 106. The viewer will then be offered a plurality of editing options at step 1005. The viewer may interactively select one or more editing options using the keyboard or mouse. These potential choices are depicted in block 1006, it being understood that the list of enumerated choices is not necessarily exhaustive. For example, if the television program is being scanned for the purpose of removing offensive language and/or scenes, the person editing the program may wish to delete audio, to dub audio, or to delete audio and video portions of the signal. If the editor is creating a new program using a variety of scenes from old programs, he may copy the video and/or audio portions of the signal to some space in storage allocated for the new program. The editing functions of deleting, copying, inserting, and dubbing, applied to either video or audio portions of the signal, are preferably offered to the user. Such editing functions are known in the art.

When the person performing the editing has completed any editing of a video segment that has been located by control program 220, the control program determines whether additional text strings remain to be analyzed at step 1007, and if so loops back to step 1002 to scan the next text string. When all strings have been analyzed, the search/edit function is complete, In the preferred embodiment, an interval is identified and saved when there is only a single match with the search parameters. However, it would alternatively be possible to require a minimum number of matches with the search parameters over an interval. This may be particularly useful for identifying longer video intervals, e.g., identifying entire television programs or movies. As will be appreciated by those skilled in the art of computer programming, it would be relatively simple to maintain a count of the number of matches found and identify an interval of television presentation as one of interest only if the count exceeds some specified number. It will be further understood by those skilled in the art of computer database searching that the specification of search parameters could be varied from the simple "AND" and "OR" logical relationships of the preferred embodiment. For example, additional logical operators such as "NOT" could be added; variations of root words could be searched, etc.

A preferred embodiment has been described in which the hardware is capable of receiving television signals from and scanning a single channel at a time. However, in an alternative embodiment, it is possible to receive and scan multiple channels simultaneously. In this multiple channel alternative embodiment, it will be possible to save video from multiple channels simultaneously, and thus the full advantages of scanning numerous broadcasts for information of interest in accordance with the present invention can be realized, at some cost in additional hardware.

To support the multiple channel scanning embodiment, all hardware must be capable of servicing the increased requirements. The bus 201, CPU 202, storage controller 210 and storage 105 should be capable of multiplexing between processing data from different channels simultaneously. However, separate tuners 101 and video capture units 207 may be required. Additionally, separate closed captioning decoders 103 may be required. The need for separate components to handle each channel being scanned would depend on the speed of the device selected, its ability to buffer data, etc. It is anticipated that as the speed of electronic devices improves and costs decline, the multiple channel alternative embodiment will become more attractive. It is further anticipated that as a result of closely integrating the various components, it may be necessary to duplicate only small portions of the hardware (such as the tuner) to achieve multiple simultaneous channel scanning. However, it is possible to construct the multiple channel embodiment using hardware currently available by simply duplicating sufficient hardware. Since bus 201 available on standard personal computers may be insufficient to handle the volume of data involved in multiple channels, this may require that computer 104 itself be duplicated, in addition to tuner 101, splitter 102, decoder 103, etc.

In the multiple channel scanning embodiment, control program 220 executes the same steps shown in FIGS. 8A and 8B with respect to a single channel scanning embodiment. However, multiple video signals from multiple channels are simultaneously converted to digital and written to buffer 222. Thus, block 804 of FIG. 8A may be thought of as being repeated multiple times in parallel, one for each channel being received and converted to video. The appropriate steps shown in FIG. 8B are performed separately by control program 220 for each channel being scanned. Because a match of the keyword search parameters is performed separately for each channel, there must be a separate match flag and match timer for each channel being scanned. As explained previously, control program 220 can normally complete steps 810–838 in much less time than it takes video capture unit 207 to receive and digitize a segment of video information. Therefore, there is ample time for control program 220 to serially perform the required steps separately for each channel being scanned.

A separate buffer 222 is required for each channel being scanned in the multiple channel alternative embodiment. This need may require a larger memory 220 than would be required in the single channel preferred embodiment. A separate segment pointer 325 is required for each buffer, which means that at step 814 control program 220 must increment each segment pointer, and send a separate command to each video capture unit at step 815.

The profile data structures required to support multiple channel scanning have already been described and shown in FIGS. 4A–4E. Thus, a single channel block 420 exists for each channel to be scanned. Since channel blocks contain next channel pointer field 422, a chain of channel blocks of indefinite length can be specified, enabling the specification of multiple channels.

A preferred embodiment of this invention has been described above, with particular attention to hardware components and subassemblies currently available in the commercial market. It is thus possible for one skilled in the art to construct the system described herein from such hardware components. However, in an alternative preferred embodiment, it would be possible to construct the system described herein as a single integrated unit. In this alternative embodiment, the components shown in FIG. 1 which make up system 100 are not necessarily physically separated units, but some may exist on a common circuit card. Additionally, in this alternative embodiment, computer system would not necessarily be a general purpose computer system, but may be a special purpose computer dedicated to the functions of the presentation system described herein. For example, such a system may have only one program it is capable of executing, which may be stored in a permanent read-only memory (ROM). It is expected that if such a presentation system were to be mass-marketed and used by viewers unfamiliar with computer operating systems, such an integrated unit having a dedicated program would be preferable to the system having separate components, including a general purpose computer, as described in the first preferred embodiment.

In the preferred embodiment, the textual stream carried in the closed captioning data portion of the vertical blanking interval is used as a source of information to be matched with the search parameters. The closed captioning data is used in the preferred embodiment because it has been adopted as a standard within the United States. However, in an alternative embodiment, it would be possible to transmit other data in the vertical blanking interval or other portion of the video signal for decoding and extracting information.

With regard to alternative sources of the text stream, it would in particular be possible to employ a speech recognition device to extract speech from the audio component of the signal and convert this to a digital text stream, as shown in FIG. 1 as optional item 130. While speech recognition unit 130 is shown in FIG. 1 as an independent, stand alone unit, it should be understood that speech recognition capability could be provided by a card which plugs into an available slot in computer 104, or alternatively speech recognition could be accomplished via suitable software stored in memory 203 of computer 104 and executing on CPU 202. Many speech recognition devices are commercially available at the present time, although such devices may have limited vocabularies or accuracy. Even so, such speech recognition devices could be used alone or in conjunction with closed captioning decoding to provide a text stream.

As an example of such a use of a speech recognition device, it is common for closed captioned text to contain "simplified" or "watered-down" versions of the actual spoken text of the audio signal. In most cases, the information content is the same, so decoding of the closed captioning signal provides an adequate representation of the speech content. But for some purposes this is not true. Particularly, closed captioning text may water-down offensive language. Thus, where the present invention is being used as a censoring device to monitor offensive language, the concurrent use of a speech recognition device to generate additional text to be searched by control program 220 provides additional accuracy. Because the number of offensive words may be small, the limited vocabulary of commercially available speech recognition units is not necessarily a handicap. Of course, it is anticipated that as speech recognition devices achieve greater accuracy and speed, their use in the present invention may become more desirable.

The video presentation system of the preferred embodiment is designed for use by a television viewer and for that reason includes functions such a viewer would typically desire. However, in any of various alternative embodiments, it would be possible to design special purpose devices having only some of the functional capabilities of the video presentation system of the preferred embodiment and/or being designed for different markets. For example, in an alternative embodiment a video editing facility could be designed having the search/edit function described herein, but without the automatic scan function. Such a video editing facility may, for example, be useful to a television producer to enable editing of television programs to be broadcast at a later time. In such an environment, the automatic scan function would probably be considered unnecessary. In other alternatives, the automatic scan function could be present without the full range of editing capabilities of the search/edit function.

In a further alternative embodiment, the video presentation system of the present invention could be used in conjunction with a video library for accessing information from the library. In this alternative embodiment, a library would contain a large bank of video information for distribution. Distribution could be by physical means such as video cassettes, or by on-line means from mass storage such as CD-ROM. The present invention would be used as a library index for finding video material of interest in the video library. A typical library patron would define a profile indicating video of interest. This profile would by used in a similar manner to that of the profile described above and depicted in FIGS. 4A–4E, but may contain other fields helpful in searching from a video library. For example, the video library may have a system of classification, which could be used to narrow the scope of the search. The library's computer system, using the profile defined by the library patron, would scan a closed captioning text stream for matches with the search parameters in the profile, This would require that, at the very least, the closed captioning signal be available on-line for scanning. When the system locates a segment of interest, the segment would preferably be displayed to the library patron on a video monitor, and the patron could then decide whether the video selection from which the segment is taken is of interest.

Although a specific embodiment of the invention has been disclosed along with certain alternatives, it will be recognized by those skilled in the art that additional variations in form and detail may be made within the scope of the following claims.

What is claimed is:

1. A television presentation system, comprising:

a television signal receiver for receiving a television signal from an external source;

a closed captioning decoder for extracting from said television signal a closed captioning stream of textual data;

means for receiving from a user one or more search parameters, said search parameters representing information content of interest to the user;

means for searching said stream of textual data for occurrences of textual data matching said one or more search parameters;

means for identifying one or more segments of said television signal, each said segment corresponding to an occurrence of said textual data matching said one or more search parameters.

2. The television presentation system of claim 1, wherein said one or more search parameters comprise one or more key words.

3. The television presentation system of claim 2, wherein said one or more search parameters comprise a plurality of key words, linked by one or more logical relationships.

4. The television presentation system of claim 1, further comprising:

means for storing said television signal; and means for editing said stored television signal.

5. The television presentation system of claim 4, wherein said means for editing said television signal comprises means for deleting portions of said signal in the vicinity of said one or more segments corresponding to occurrences of said textual data matching said one or more search parameters.

6. The television presentation system of claim 4, wherein said means for editing said television signal comprises means for deleting portions of said signal other than said one or more segments corresponding to occurrences of said textual data matching said one or more search parameters.

7. The television presentation system of claim 1, further comprising a display for displaying a television signal, wherein said display, said television signal receiver, said closed captioning decoder, said search parameter receiving means, said searching means, and said segment identifying means are an integrated unit.

8. The television presentation system of claim 1, further comprising means, responsive to said means for identifying one or more segments, for storing said one or more segments of said television signal corresponding to occurrences of said textual data matching said one or more search parameters.

9. A method for identifying television data of interest, comprising the steps of:

specifying one or more search parameters for identifying television data of interest, said search parameters representing information content of interest;

receiving a television signal;

decoding a closed captioning portion of said television signal to produce a closed captioning stream of textual data;

searching said closed captioning stream of textual data for data which matches said one or more search parameters;

identifying one or more segments of said television signal, each said segment corresponding to an occurrence of said closed captioning stream of textual data matching said one or more search parameters.

10. The method for identifying television data of interest of claim 9, wherein said one or more search parameters comprise one or more key words.

11. The method for identifying television data of interest of claim 10, wherein said one or more search parameters comprise a plurality of key words, linked by one or more logical relationships.

* * * * *